April 2, 1957     T. A. HESS ET AL     2,787,305
RETAINING MEANS FOR POWER TOOL GAUGE
Filed Nov. 29, 1954
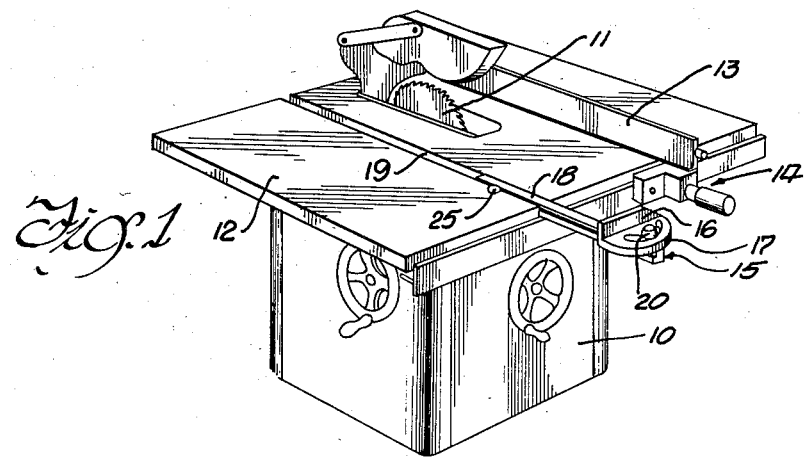
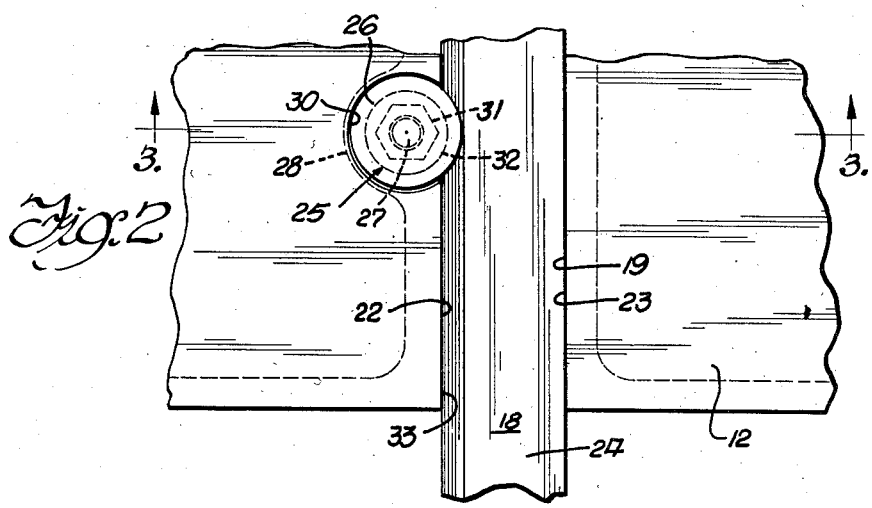
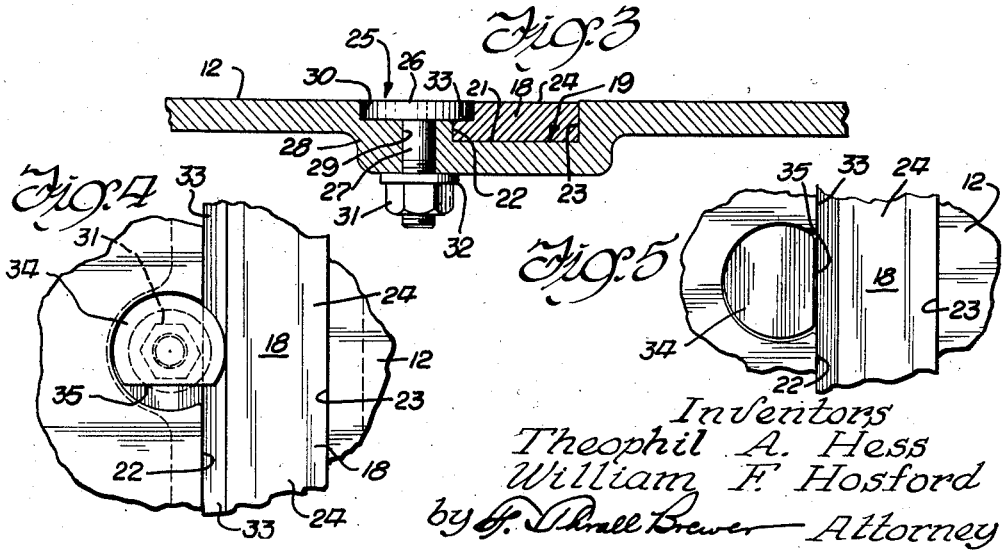
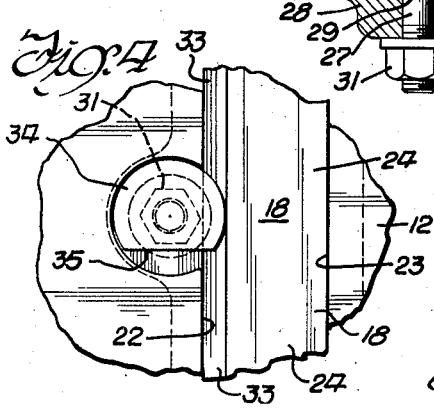
Inventors
Theophil A. Hess
William F. Hosford
by G. Thrall Brewer — Attorney

United States Patent Office 2,787,305
Patented Apr. 2, 1957

2,787,305

RETAINING MEANS FOR POWER TOOL GAUGE

Theophil A. Hess, Island Lake, and William F. Hosford, Chicago, Ill., assignors to Duro Metal Products Co., Chicago, Ill., a corporation of Illinois Application November 29, 1954, Serial No. 471,792

4 Claims. (Cl. 144—253)

This invention relates to an improvement in power tools and particularly to a retaining means for a gauge used in one form thereof.

For purposes of illustration this invention will be described with reference to its application to a circular saw and its work-supporting table, but it is understood that it may be applied to other power tools as well.

Among the accessories which may be furnished with a circular power saw for cutting wood or the like are various guides for assisting the operator in making cuts of the required straightness, angularity, or the like. Where angle cuts are to be made for mitered corners, a device known as a miter gauge may be supplied. Such gauge may consist of a relatively long rod on one end of which is mounted an angularly adjustable short fence against which the work piece may be held at the desired angle relative to the plane of the saw blade while it is advanced toward the saw. The rod is disposed in a groove formed in the top of the saw table, the groove serving to guide the rod in its movement parallel to the plane of the saw, and also dropping the rod completely below the surface of the table to avoid interfering with the work piece.

Since cost of manufacture is an important factor in woodworking tools, particularly as to those designed for the home workshop market, the grooves supplied for the rods of miter gauges have been of simple rectangular form in cross section, with their parallel sides disposed in planes normal to the plane of the table. Due to the weight of the angularly adjustable fence on the gauge, when the gauge is pulled outwardly toward the operator to the point where the fence overhangs the edge of the table, it frequently happens that the center of gravity of the gauge including the rod, will be off the table and the rod accordingly will tilt and fall out of the groove provided for it. An obvious solution for this problem would be to mill either a dovetail slot, or some form of partially closed slot, in the table in place of the parallel-sided slot. The dovetail form of slot is expensive to make, however, and increases the cost of the tool in an amount which is out of proportion to the benefit obtained therefrom.

An object of this invention is the provision of a retaining means for a miter gauge for a saw table or the like, which will effectively retain the miter gauge on the table despite the normal overhang of the center of gravity of the gauge relative to the table top encountered during the use of the power tool, which retaining means will be inexpensive to make and simple to use and which will not interfere with the intended use of the gauge.

Another object of this invention is the provision of a miter gauge which requires only a straight sided groove in an associated work table, with means formed by ordinary turning or screw machine operations for holding the miter gauge slidably on the work table.

As a more specific object, this invention seeks to provide a miter gauge retaining means for a table of a circular saw, the table having the usual parallel-sided groove for the reception of the rod of the miter gauge, and having means formed by ordinary turning processes for holding the miter gauge in the groove, said means being readily made inoperative so that the gauge may be operated as though retained in the conventional manner.

These and other objects of this invention will become apparent from the following detailed description when taken together with the drawings, in which:

Fig. 1 is an elevational view in perspective of a power saw and table to which the miter gauge retaining means of this invention has been applied;

Fig. 2 is a fragmentary plan view of the table of Fig. 1 on a greatly enlarged scale showing the manner in which the retaining means of this invention is applied thereto;

Fig. 3 is a fragmentary elevational view in cross section of the retaining means, the view being taken along the line 3—3 of Fig. 2;

Fig. 4 is a fragmentary plan view of a modification of the retaining means of Fig. 2 shown in an operative position; and Fig. 5 is a corresponding plan view of the modification of Fig. 4 showing the retaining means in an inoperative position.

Referring now to the drawings for a detailed description of the invention, there is shown in Fig. 1 a typical circular saw power tool such as is used in home woodworking shops. The tool is mounted on a base 10 which houses the motor or other drive means for a disc type saw 11 as well as the means for raising or lowering the saw 11 and for tilting the saw for making angular cuts. Surmounting base 10 is a table 12, the function of which is to support the work to be operated upon by saw 11. A fence 13, extending in a direction generally parallel to the plane of saw 11 when the saw is arranged to make a square cut on a work piece, extends from front to rear of the table, the front for the purposes of this description being the portion of the table nearest the operator or toward the right in the plane of saw 11 and the rear being the portion farthest away. Fence 13 serves to guide the work as it is moved toward the saw 11. Any suitable means 14 for adjusting fence 13 laterally with respect to saw 11 may be provided at the front part of table 12. Fence 13 thus is used when making cuts parallel to an edge of the work piece or to a plane passing through the two most prominent points on such edge.

For making angular cuts such as may be required to make a mitered joint, a miter gauge is used. A typical gauge for this purpose is shown at 15 and is comprised, in general, of a short fence 16 mounted at right angles to a horizontal plate 17 which, in turn, is mounted on a bar 18 received in a groove 19 formed in the upper surface of table 12. Plate 17 may be rotated about a vertical axis on bar 18 by means (not shown) and fixed in any given angular position relative to bar 18 by a suitable clamping device shown generally at 20.

Groove 19 extends across table 12 in a direction parallel with the plane of saw 11 and may be initially molded and subsequently machined to have a smooth bottom surface 21 and vertical sides 22 and 23. For best results, sides 22 and 23 are preferably made parallel to one another and at right angles to the plane of the top surface of table 12. It is understood, however, that sides 22 and 23 need not be flat, nor need they be parallel, it being sufficient that the opening formed by sides 22 and 23 when viewed in plan have parallel sides.

Bar 18 may be standard cold rolled steel of rectangular cross section having a thickness such that the top surface 24 thereof does not extend above the top surface of table 12, and preferably constitutes an extension thereof. The width of bar 18 should be such as to permit said bar to slide easily in groove 19 but snug enough to prevent lateral movement thereof in the groove in the plane of table 12.

The means for retaining bar 18 in groove 19 comprises a button 25 having in its preferred form a circular head 26 and a threaded shank 27. A boss 28 is formed in the under side of table 12 adjacent groove 19 and a hole 29 is bored through boss 28 to receive the shank 27 of button 25. The upper end of hole 29 is counterbored at 30 to receive head 26, the depth of the counterbore being sufficient to cause the top surface of head 26 to be level with, or slightly below, the top surface of table 12. A nut 31 and lock washer 32 serve to clamp button 25 to table 12.

The upper left hand corner of bar 18 as viewed in Fig. 3 has a rectangular notch 33 formed therein along the entire length of said bar. Hole 29 is so located relative to groove 19 that head 26 of button 25 will project into groove 19. Notch 33, however, is of sufficient size to accommodate the projecting portion of head 26, the depth of the notch being slightly greater than the thickness of head 26 so that bar 18 can slide readily past button 25.

Boss 28 and hole 29 for button 25 are preferably disposed near the forward edge of table 12 as shown more clearly in Fig. 1. Since bar 18 will fulcrum on the forward edge of the bottom surface 21 of groove 19, it is desirable to have button 25 located a sufficient distance inward of said edge to avoid the creation of a large mechanical advantage in the bar when the gauge is pulled forward as far as is possible without losing contact with button 25. Such large mechanical advantage would throw considerable strain on button 25 and would either warp or bend the head 26 or possibly jam the free end of the bar against said head.

Since ample clearance is provided between head 26 and rectangular notch 33 in bar 18, button 25 may be made secure in table 12 and miter gauge 15 may be assembled relative to button 25 at a subsequent time. Thus, miter gauge 15 may be completely removed from table 12 and then inserted into groove 19 and slid therein past button 25 to any desired position fore and aft of table 12. Should it be pulled forward to substantially the position shown in Fig. 1, it will nevertheless remain in groove 19 due to the holding effect of head 26 and would not fall out of the groove 19 as was heretofore possible.

For those operators who are accustomed to removing the miter gauge 15 by raising it out of groove 19, the form shown in Figs. 4 and 5 may be used. In that form the button may be identical to button 25 with the exception that the head 34 thereof is cut off on one side to provide a flat surface 35 which, when the button is turned as shown in Fig. 5, is an extension of, or is disposed slightly to the left of, side 22 of groove 19. When disposed as shown in Fig. 5, therefore, head 34 does not overhang any part of bar 18 and accordingly the bar may be raised vertically out of groove 19 in the manner heretofore provided. When it is desired that head 34 perform the retaining function of head 26 in the Fig. 2 and 3 design, said head 34 is rotated until a sufficient portion thereof overhangs groove 19 substantially to obstruct the movement of bar 18 vertically out of groove 19. Head 34 may, of course, be locked in any position by nut 31.

It may be observed that button 25 may be made as a screw machine product and hence is relatively inexpensive. Groove 19 is likewise inexpensive to make since it involves the formation of substantially parallel sides 22 and 23 which may be done by inexpensive machining operations such as shaping or milling or both. Where accurate molding techniques are available it may be molded in substantially finished form without the use of subsequent machine operations. Bar 18 likewise is standard except for the formation of a rectangular notch, and where larger quantities of the bar are to be used, the notch may be rolled in thereby eliminating expensive machining operations. The form shown in Figs. 4 and 5 is slightly more expensive in that an additional operation is required to remove the overhanging portion of the head 34 to form the flat surface 35, but in all other respects, the bar 18 and button 25 are the same.

It is understood that the foregoing description is merely illustrative of preferred embodiments of the invention and that the scope of the invention therefore is not to be limited thereto but is to be determined by the appended claims.

We claim:

1. In a power tool having a table provided with a groove in its work-supporting surface and with a gauge including a bar disposed in said groove and slidable therein longitudinally of the groove, said groove being rectangular in cross section; a gauge-retaining means on the table adjacent the groove and comprising a button having a circular head at least a portion of which projects into the groove and overlies a portion of the bar, and having a threaded shank extending through the table to one side of said bar, and a nut cooperating with the threaded shank to clamp the button to the table, said bar having a longitudinal recess longer than and adapted to receive the projecting portion of the head, and said button and bar terminating substantially at or below the work-supporting surface of the table.

2. In a power tool having a table provided with a groove in its work-supporting surface and with a gauge including a bar disposed in said groove and slidable therein longitudinally of the groove, said groove being rectangular in cross section; a gauge-retaining means on the table adjacent the groove and comprising a button having a threaded shank extending through the table to one side of said bar, and a head of irregular shape taken transversely of the axis of the shank, such that in one angular position the head projects into the groove and overlies a portion of the bar, and in another position angularly removed from the first said position no portion of the head overlies bar, said bar having a longitudinal recess longer than and adapted to receive the overlying portion of said head and a nut cooperating with the threaded shank to clamp the button to the table in either one of the said positions.

3. In a power tool having a table provided with a groove in its work-supporting surface and with a gauge including an elongated bar disposed in said groove and slidable therein longitudinally thereof, said bar having a recess in a longitudinal side thereof, said recess extending longitudinally along said bar and having a defining wall below the level of the work-supporting surface of said table, and a detent mounted on the table at the side of said groove adjacent said recess for movement into and out of said recess and to and from overlying relationship with said defining wall slidably to retain said bar in said groove.

4. In a power tool as described in claim 3 wherein said detent comprises a rotatable head having an arcuate portion of a diameter to project into said recess and overlie a marginal portion of said bar in one angular position of the head and having a cut-away portion providing a position angularly removed from the first said position in which the bar is free of the head portion.

References Cited in the file of this patent

UNITED STATES PATENTS

| | | |
|---|---|---|
| 2,458,846 | Gilmore | Jan. 11, 1949 |
| 2,502,124 | Bray | Mar. 28, 1950 |
| 2,710,633 | Oberg | June 14, 1955 |